US011838238B1

(12) United States Patent
Andreoli-Fang et al.

(10) Patent No.: US 11,838,238 B1
(45) Date of Patent: Dec. 5, 2023

(54) SYSTEM AND METHOD FOR PIPELINING HARQ RETRANSMISSIONS FOR SMALL CELL BACKHAUL

(71) Applicant: CABLE TELEVISION LABORATORIES, INC., Louisville, CO (US)

(72) Inventors: Jennifer Andreoli-Fang, Boulder, CO (US); Balkan Kecicioglu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 146 days.

(21) Appl. No.: 17/120,552

(22) Filed: Dec. 14, 2020

Related U.S. Application Data

(63) Continuation of application No. 15/649,391, filed on Jul. 13, 2017, now Pat. No. 10,868,655.

(Continued)

(51) Int. Cl.
| | | |
|---|---|---|
| *H04L 1/08* | (2006.01) | |
| *H04B 7/212* | (2006.01) | |
| *H04J 3/16* | (2006.01) | |
| *H04L 5/00* | (2006.01) | |
| *H04L 1/1867* | (2023.01) | |
| *H04W 72/0446* | (2023.01) | |
| *H04W 72/20* | (2023.01) | |
| *H04W 72/23* | (2023.01) | |
| *H04W 28/02* | (2009.01) | |
| *H04L 1/1812* | (2023.01) | |

(52) U.S. Cl.
CPC .......... *H04L 5/0055* (2013.01); *H04L 1/1887* (2013.01); *H04W 72/0446* (2013.01); *H04W 72/20* (2023.01); *H04W 72/23* (2023.01); *H04L 1/1812* (2013.01); *H04W 28/0278* (2013.01)

(58) Field of Classification Search
CPC . H04L 5/0044; H04L 1/1812; H04L 12/2861; H04L 12/413; H04L 2001/0097; H04L 1/08; H04L 1/0065; H04L 1/16; H04L 25/03006; H04L 5/006; H04L 1/187; H04W 24/10; H04W 72/0446; H04W 72/1278; H04W 72/20; H04W 28/065; H04W 84/045; H04W 88/085; H04W 72/12; H04J 11/005; H04B 15/00; H04B 17/11; H03M 13/2707; H03M 13/2915; H03M 13/09
USPC ........................................................ 370/329
See application file for complete search history.

(56) References Cited

U.S. PATENT DOCUMENTS 6,633,683 B1    10/2003  Dinh et al.
7,187,669 B1 *  3/2007  Lee ........................ H04L 12/413
                                             370/347

(Continued)

*Primary Examiner* — Edan Orgad
*Assistant Examiner* — Vanneilian Lalchinthang
(74) *Attorney, Agent, or Firm* — PdZ Patent Law, PLLC

(57) ABSTRACT

A system and method for reducing latency in a N/ACK system is described. The present system and method reduces latency in a N/ACK system by pre-generating one or more unsolicited backhaul grants to prepare one or more backhaul elements for the receipt and transmission of wireless data. In an embodiment, the present system and method additionally generates backhaul NACK holds for delaying the transmission of a NACK such that a NACK arrive at the UE at a predesignated time, such as at the subframe 12 after the original transmission at the subframe 0.

20 Claims, 6 Drawing Sheets

Related U.S. Application Data

(60) Provisional application No. 62/405,686, filed on Oct. 7, 2016, provisional application No. 62/362,033, filed on Jul. 13, 2016.

(56) References Cited

U.S. PATENT DOCUMENTS

| | | |
|---|---|---|
| 8,874,926 B1 | 10/2014 | Edwards et al. |
| 10,887,061 B2 | 1/2021 | Andreoli-Fang et al. |
| 2003/0016770 A1 | 1/2003 | Trans et al. |
| 2003/0031198 A1* | 2/2003 | Currivan ........... H03M 13/2707 370/465 |
| 2003/0177502 A1* | 9/2003 | Kolze ................ H04N 21/6118 725/111 |
| 2003/0179769 A1 | 9/2003 | Shi et al. |
| 2004/0068748 A1* | 4/2004 | Currivan ............. H04L 27/3411 725/111 |
| 2006/0058038 A1 | 3/2006 | Das et al. |
| 2006/0285544 A1* | 12/2006 | Taylor ................ H04N 7/17318 348/E7.071 |
| 2007/0191054 A1 | 8/2007 | Das et al. |
| 2010/0011269 A1* | 1/2010 | Budianu ................. H04L 5/006 714/748 |
| 2010/0146355 A1* | 6/2010 | Jiang ..................... H04L 1/1819 714/E11.113 |
| 2010/0265906 A1* | 10/2010 | Bucknell ............... H04L 1/1861 370/329 |
| 2010/0322187 A1 | 12/2010 | Tani et al. |
| 2012/0020275 A1* | 1/2012 | Wei ......................... H04L 1/188 370/312 |
| 2012/0327799 A1* | 12/2012 | Sandlund .......... H04W 72/1221 370/252 |
| 2013/0163524 A1* | 6/2013 | Shatzkamer ............ H04L 69/22 370/329 |
| 2013/0170461 A1 | 7/2013 | Ren |
| 2014/0112656 A1 | 4/2014 | Yamashita |
| 2014/0161083 A1 | 6/2014 | Nobukiyo |
| 2014/0185428 A1 | 7/2014 | Thibeault et al. |
| 2014/0286258 A1 | 9/2014 | Chowdhury et al. |
| 2015/0173011 A1 | 6/2015 | Das et al. |
| 2016/0157211 A1 | 6/2016 | Kato et al. |
| 2016/0197660 A1 | 7/2016 | O'Keeffe et al. |
| 2017/0078890 A1* | 3/2017 | Zhu ........................ H04W 8/08 |
| 2017/0142709 A1* | 5/2017 | Lake .................... H04W 24/08 |
| 2018/0027493 A1* | 1/2018 | Li .............................. H04L 5/14 370/280 |
| 2018/0270103 A1* | 9/2018 | Chapman ............... H04L 1/1887 |

\* cited by examiner

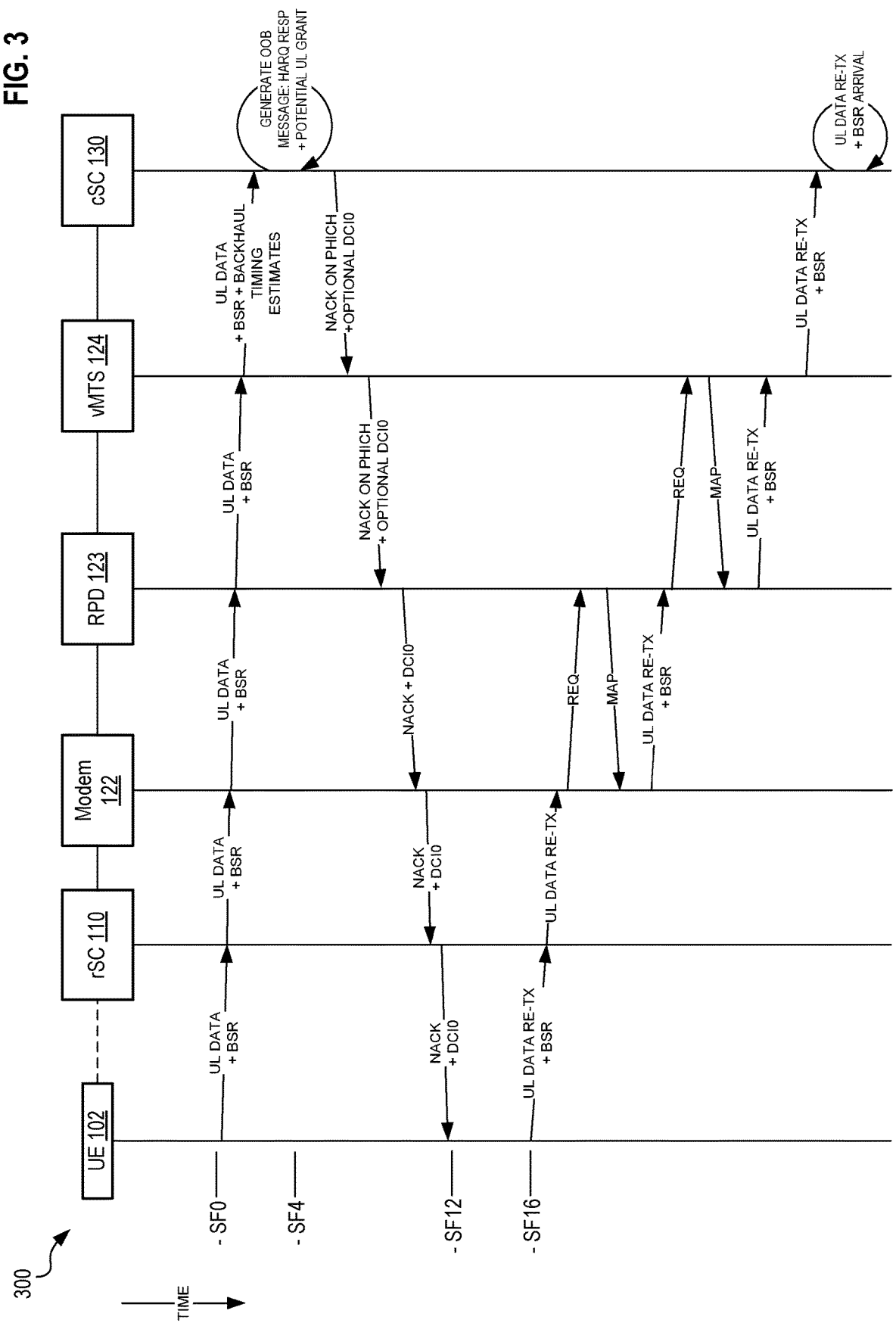

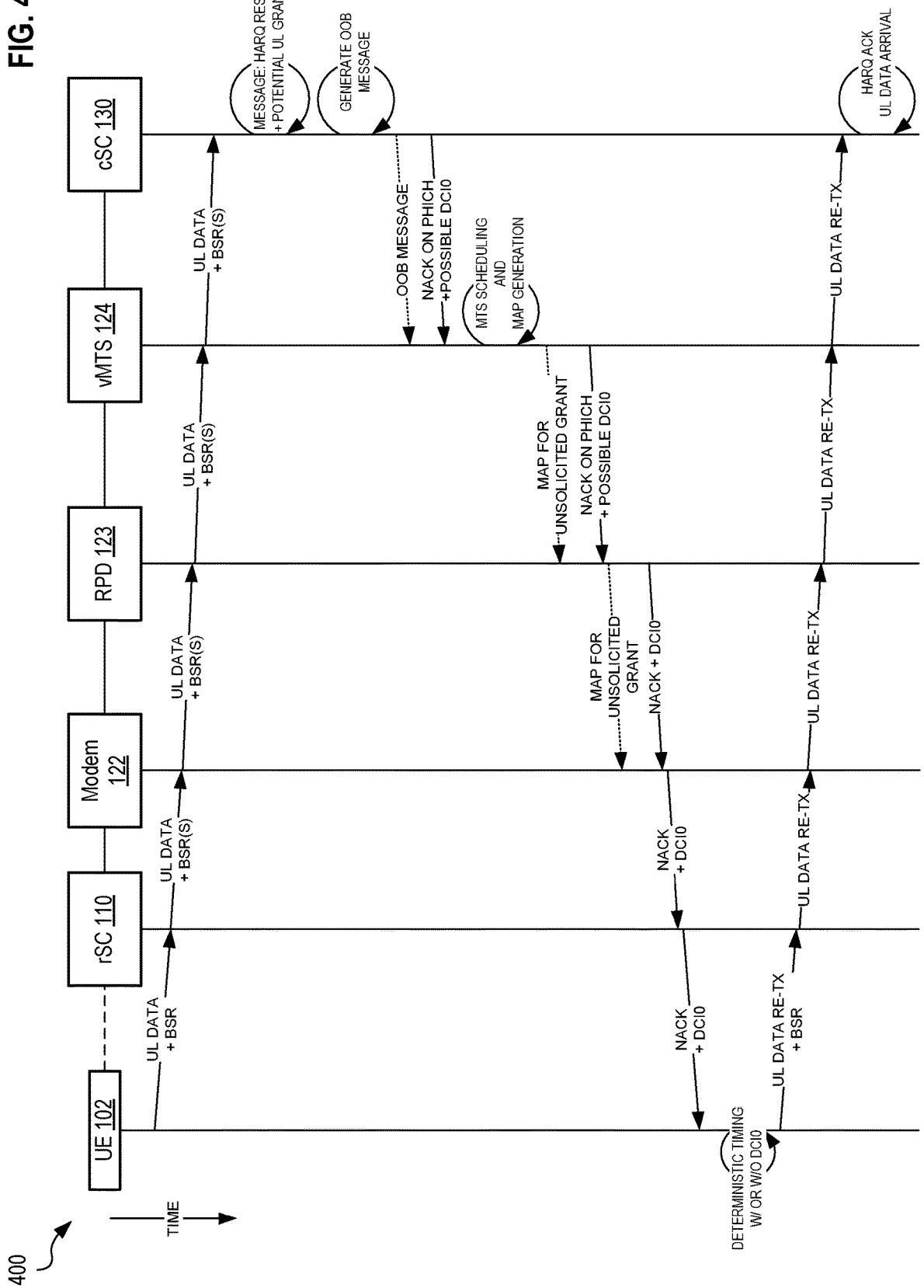

_US 11,838,238 B1_

SYSTEM AND METHOD FOR PIPELINING HARQ RETRANSMISSIONS FOR SMALL CELL BACKHAUL

RELATED APPLICATIONS

This application is a continuation of U.S. patent application Ser. No. 15/649,391, filed Jul. 13, 2017, which application claims priority to U.S. Provisional Application No. 62/362,033, filed 13 Jul. 2016, and U.S. Provisional Application No. 62/405,686, filed 7 Oct. 2016, all of which are incorporated herein by reference.

PARTIES TO A JOINT RESEARCH AGREEMENT

The presently claimed invention was made as a result of activities undertaken within the scope of a joint research agreement between Cable Television Laboratories, Inc. and Cisco Systems, Inc.

TECHNICAL FIELD

This disclosure relates in general to the field of communications and, more particularly, techniques for integration of wireless access and wireline networks.

BACKGROUND

Today's communication systems may include separate wireless and wireline portions, each of which may be owned and controlled by the same or different operators. Even though some operators, such as cable operators also known as Multiple System Operators ("MSOs"), use Data Over Cable Service Interface Specification ("DOCSIS") networks for backhauling Internet traffic, separate networks, such as mobile networks, DOCSIS networks, Wi-Fi networks, and radio networks have limited to no visibility into parts of the other network types. Typically, each network type, such as DOCSIS and LTE, have separate traffic scheduling algorithms. As a result, currently when these types of networks are combined, the resulting architecture may be inefficient and may result in higher latency due to internetwork visibility and communication.

SUMMARY OF THE INVENTION

In an embodiment, the present NACK unsolicited grant generating system and method is formed within and utilized by a Modem Termination System (MTS). It will be understood that an MTS may be anyone one of a CMTS, an ONT, an OLT, a Network Termination Units, a Satellite Termination Units, and other termination systems, collectively herein called a "Modem Termination System" or "MTS." The MTS in the present embodiment includes a modem termination system (MTS) receiving device for receiving a Not Acknowledge (NACK) message from centralized Small Cell (cSC). The MTS then utilizes an unsolicited grant processor for analyzing the received NACK message and generates at least one unsolicited backhaul grant. The at least one unsolicited backhaul grant is put into place within the backhaul system for the purpose of preparing the backhaul communication system to immediately forward the retransmission of a previously failed transmission.

In another embodiment, the present invention is a NACK hold generating system. The NACK hold generating system generates a backhaul hold to delay the transmission of the NACK within the backhaul system to ensure the NACK arrives at its destination at a predesignated time. One example of a predesignated time is at subframe 12 after the original failed transmission at subframe 0. The present NACK hold generating system includes a modem termination system (MTS) receiving device configure in a backhaul communication system for receiving a Not Acknowledge (NACK) message from centralized Small Cell (cSC). The MTS also includes a NACK hold processor for analyzing the received NACK message and generating at least one NACK hold instruction for delaying the transmission for the NACK at one or more of the backhaul communication systems elements.

Other embodiments contemplated utilize an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of x-hauling traffic, examples include without limitation satellite operator's communication systems, Wi-Fi networks, optical networks, DOCSIS networks, MIMO communication systems, microwave communication systems, short and long haul coherent optic systems, etc. X-hauling is defined here as any one of or a combination of front-hauling, backhauling, and mid-hauling. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

BRIEF DESCRIPTION OF THE INVENTION

FIG. 3 shows one exemplary simplified block diagram and timing diagram for a Small Cell-BackHaul (SC-BH) communication system, in an embodiment.

FIG. 4 shows one exemplary simplified block diagram and timing diagram for a Small Cell-BackHaul (SC-BH) communication system, in an embodiment.

DETAILED DESCRIPTION OF THE FIGURES

Figure 1:
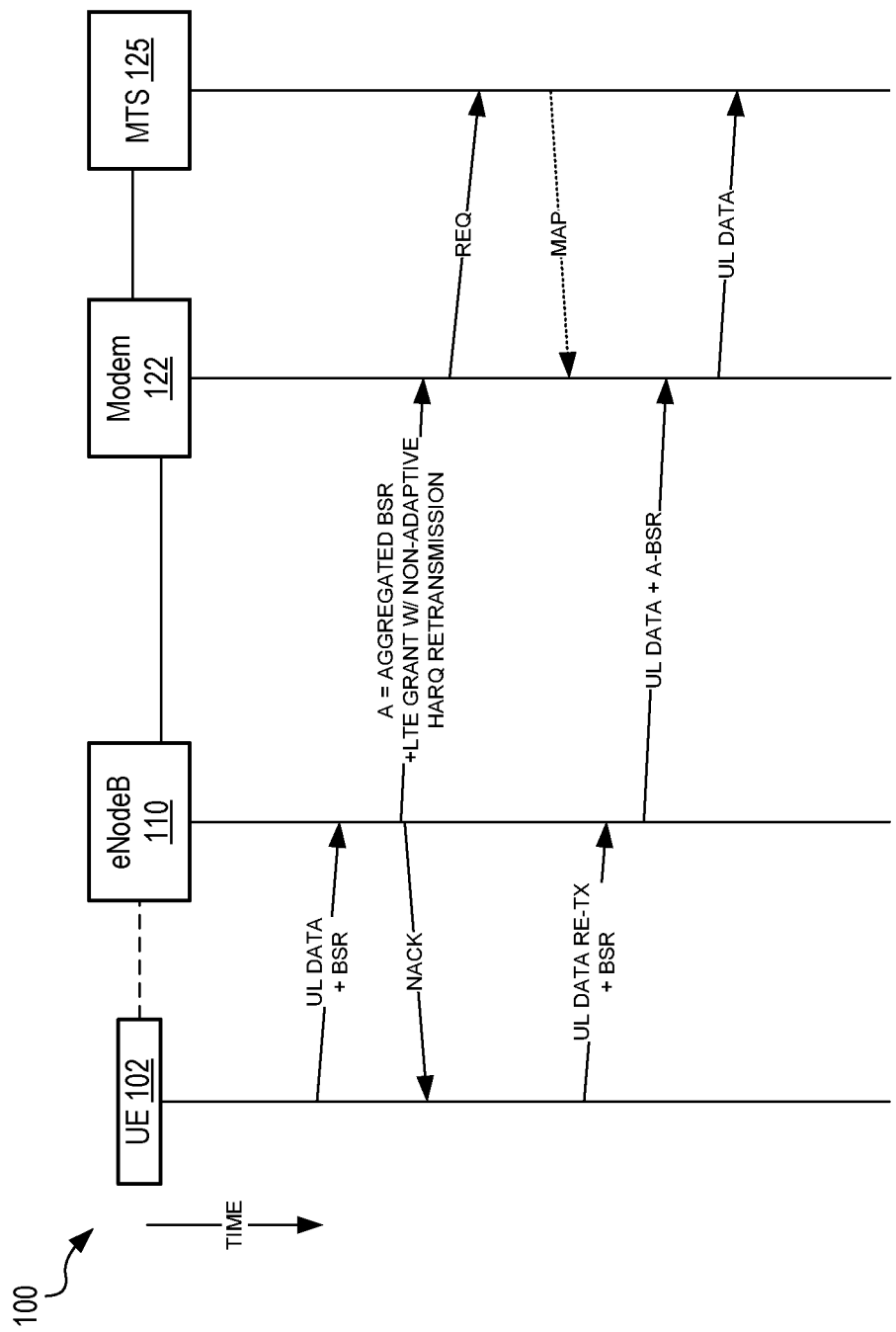
FIG. 1 shows one exemplary Hybrid Automatic Repeat Request (HARQ) retransmission process in an LTE-Backhaul environment, in an embodiment.

FIG. 1 shows one exemplary Hybrid Automatic Repeat Request (HARQ) retransmission process in an LTE-Backhaul environment 100. Environment 100 employs an eNodeB 110 (also called herein an eNB) located between and in communication with a User Equipment 102 UE and a modem 122. Modem 122 is also in communication with a modem termination unit (MTS) 125.

In the present embodiment UE 102 transmits Uplink (UL) data plus a Buffer Status Report (BSR) to eNodeB 110. Upon receipt of the Uplink (UL) data plus a Buffer Status Report (B SR) eNodeB 110 determines the data must be retransmitted. Based on the retransmit determination eNodeB 110 performs two actions, one upstream and the other downstream. The upstream action is to aggregate all received BSRs and LTE Grants and transmits this data to modem 122 to prepare the back haul system for the receipt of a retransmitted data package. The back haul system here is shown including modem 122 and MTS 125. eNodeB 110's downstream action is to send a NACK to UE 102, which at least in part instructs UE 102 to retransmit the previously sent UL data and BSR.

At modem 122, upon receipt of the aggregated BSRs and LTE Grants, modem 122 sends a request (REQ) to MTS 125 to request backhaul resources for the transmission of the forth coming retransmitted data plus BSR, shown as "UL data re-tx+BSR". In response to the REQ, MTS 125 sends a MAP or similar protocol dependent resource allocation to modem 122, which allocates the modem requested backhaul resources.

It will be understood that the UL HARQ retransmission may be non- adaptive or adaptive. A non-adaptive HARQ retransmission process sets the retransmission at a predetermined time, for example at subframe 12 (SF12), see for example FIGS. 3 and 5. In a non-adaptive HARQ retransmission process PHY attributes remain the same and are not identified or signaled via a Downlink Control Information (DCI).

Adaptive HARQ retransmission may be signaled or identified by means of a new DCI, as known in the art. It will also be understood that, in an Adaptive HARQ retransmission process, Physical Layer (PHY) attributes may be changed between retransmissions.

If eNB 110 sends a Not Acknowledge (NACK), the eNB 110 may need to account for the additional non-adaptive HARQ retransmission in an LTE grant summary, which eNB 110 sends to modem 122.

Figure 2A:
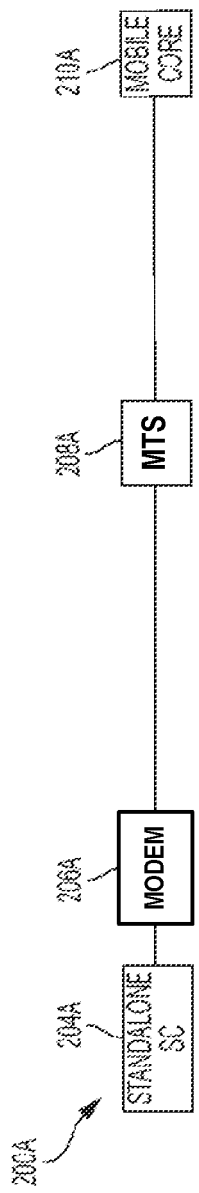
FIGS. 2A-2C are simplified block diagrams illustrating various arrangements of a Small Cell-BackHaul ("SC-BH") system including a standalone small cell for connecting user equipment ("UE") to a mobile core in accordance with embodiments described herein.

FIG. 2A illustrates a simplified block diagram of one embodiment of a small cell-backhaul (SC-BH) system communications environment 200A in which a communication network, such as but not limited to a DOCSIS network, is used to provide a backhaul for small cell data, such as but not limited to an LTE eNB, 4G, 5G, WiMAX, Wi-Fi, etc. data. The communication environment 200A supports connection of at least one UE (not shown, but similar to that shown in communication system 100), via a radio frequency ("RF") interface to a standalone small cell (SC) 204A. Small cells are available for a wide range of air interfaces including GSM, CDMA2000, TD-SCDMA, W-CDMA, LTE and WiMAX. In 3GPP terminology, a Home Node B (HNB) is a 3G femtocell. A Home eNodeB (HeNB) is an LTE femtocell. Wi-Fi is a small cell but does not operate in licensed spectrum. As used herein, UE can be associated with clients, customers, or end users wishing to initiate a communication in a communication system via some network. The term "user equipment" is inclusive of devices used to initiate a communication, such as a computer, a personal digital assistant (PDA), a laptop or electronic notebook, a cellular telephone, an smartphone, an IP phone, or any other device, component, element, or object capable of initiating voice, audio, video, media, or data exchanges within a communication system. UE may also be inclusive of a suitable interface to the human user, such as a microphone, a display, or a keyboard or other terminal equipment. UE may also be any device that seeks to initiate a communication on behalf of another entity or element, such as a program, a database, or any other component, device, element, or object capable of initiating an exchange within a communication system. The detail and best practice associated with the deployment of small cells varies according to use case and radio technology employed Data, as used herein in this document, refers to any type of numeric, voice, video, media, or script data, or any type of source or object code, or any other suitable information in any appropriate format that may be communicated from one point to another. On power up, UE can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

Referring again to FIG. 2A, the SC 204A is connected to a modem 206A. The modem 206A may be connected to one or multiple SC 204A. The modem 206A is connected to a modem termination system ("MTS") 208A via a communication link, such as but not limited to a hybrid fiber coax ("HFC"), for example. In the embodiment illustrated in FIG. 2A, the MTS 208A is implemented as an integrated MTS ("I-MTS"). The MTS 208A connects SC 204A/modem 206A to a wireless core, which in the illustrated embodiment comprises a mobile core 210A. It will be recognized that wireless core may also comprise a Wi-Fi core, LTE packet core, a 5G core, WiMAX core or any other wireless network core. It will be understood that modem 206A may be collocated with SC 204A or may be located separate and independent from SC 204A. Additionally, a collocated combination of SC 204A/modem 206A may be referred to herein as a SC-BH network element.

Figure 2B:
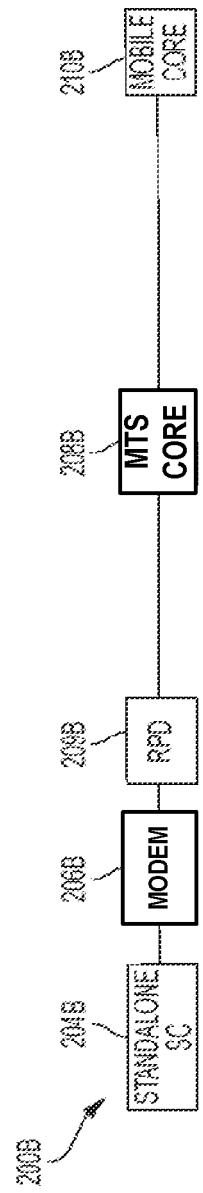

FIG. 2B illustrates a simplified block diagram of another embodiment of a SC-BH system communications environment 200B in which a communication network, such as but not limited to a DOCSIS network, is used to provide a backhaul for SC 204B, an example of which is an LTE eNB. Similar to the communications environment 200A, the communications environment 200B supports connection of at least one UE via an RF interface to a standalone SC 204B. One or multiple SC 204B may be connected to a modem 206B. In the embodiment shown in FIG. 2B, MTS functionality is split between a MTS core 208B and a Remote PHY Device (RPD) 209B. The RPD 209B/MTS core 208B connects the SC 204B and modem 206B to a mobile core 210B, which may be implemented as an LTE packet core. It will be understood that modem 206B may be collocated with SC 204B or may be located separate and independent from the SC. Additionally, a collocated combination of the SC 204B/modem 206B may be referred to herein as a SC-BH network element.

Figure 2C:
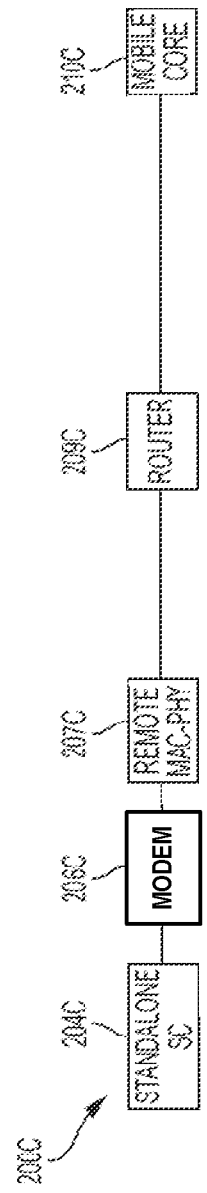

FIG. 2C illustrates a simplified block diagram of yet another embodiment of a SC-BH system communications environment 200C in which a communication network, such as but not limited to a DOCSIS network, is used to provide a backhaul for an LTE eNB. Similar to the communications environment 200A, the communications environment 200C supports connection of at least one UE via an RF interface to a standalone SC 204C. One or multiple SC 204C is connected to a modem 206C. In the embodiment shown in FIG. 2C, MTS functionality is split between a remote MAC/PHY 207C and a router 209C. The remote MAC/PHY 207C/router 209C connects the SC 204C/modem 206C to a mobile core 210C, which may be implemented as an LTE packet core. It will be understood that modem 206C may be collocated with SC 204C or may be located separate and independent from the SC. Additionally, a collocated combination of the SC 204C/modem 206C may be referred to herein as a SC-BH network element.

Figure 2D:
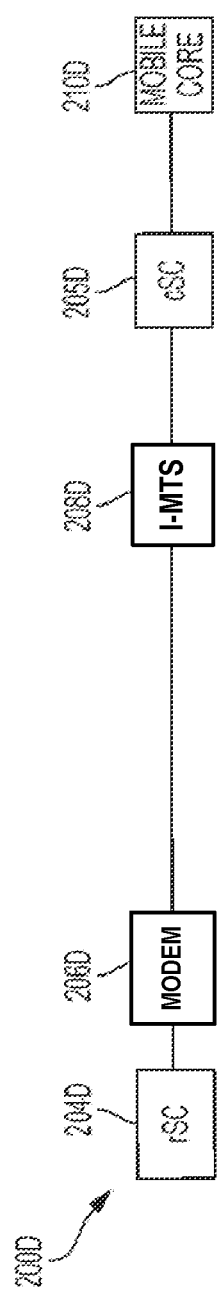
FIGS. 2D-2F are simplified block diagrams illustrating various arrangements of a SC-BH system including a split small cell for connecting UE to a mobile core in accordance with embodiments described herein.

FIG. 2D illustrates a simplified block diagram of one embodiment of a SC-BH system communications environment 200D in which a communication network, such as but not limited to a DOCSIS network, is used to provide a backhaul for an LTE eNB. The communications environment 200D supports connection of at least one UE via an RF interface to a remote Small Cell (rSC) 204D portion of a split small cell, which also includes a centralized Small Cell (cSC) portion 205D. One or more rSC 204D is connected to a modem 206D (also sometimes called just "modem" herein. The modem 206D is connected to a modem termination system ("MTS") 208D via hybrid fiber coax ("HFC"), for example. In the embodiment illustrated in FIG. 2D, the MTS 208D is implemented as an I-MTS. The MTS 208D/cSC 205D connects the rSC 204D/modem 206D to a mobile core 210D, which may be implemented as an LTE packet core. It will be understood that modem 206D may be collocated with rSC 204D or may be located separate and independent from the rSC. Additionally, a collocated combination of the rSC 204D/modem 206D may be referred to herein as a SC-BH network element. In certain embodiments, I-MTS, cSC, and/or mobile core may also be collocated.

Figure 2E:
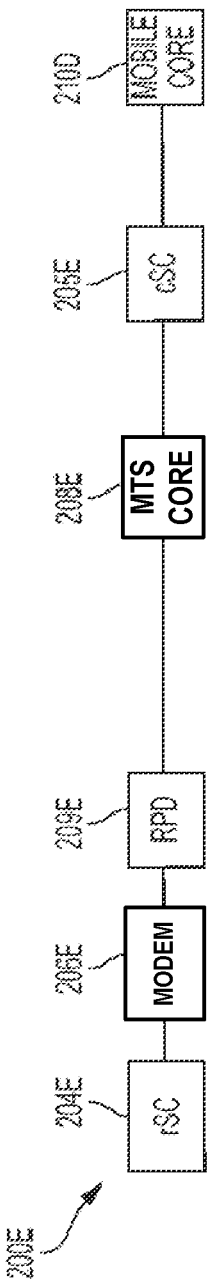

FIG. 2E illustrates a simplified block diagram of another embodiment of a SC-BH system communications environment 200E in which a communication network, such as but not limited to a DOCSIS network, is used to provide a backhaul for an LTE eNB. Similar to the communications environment 200A, the communications environment 200E supports connection of at least one UE via an RF interface to an rSC 204E portion of a split SC, which also includes a cSC portion 205E. One or more rSC 204E is connected to a modem 206E. In the embodiment shown in FIG. 2E, MTS functionality is split between a MTS core 208E and an RPD 209E. The RPD 209E/MTS core 208E/cSC 205E connects the rSC 204E/modem 206E to a mobile core 210E, which may be implemented as an LTE packet core. It will be understood that modem 206E may be collocated with rSC 204E or may be disposed in a location separate and independent from the rSC. Additionally, a collocated combination of the rSC 204E/modem 206E may be referred to herein as a SC-BH network element.

Figure 2F:
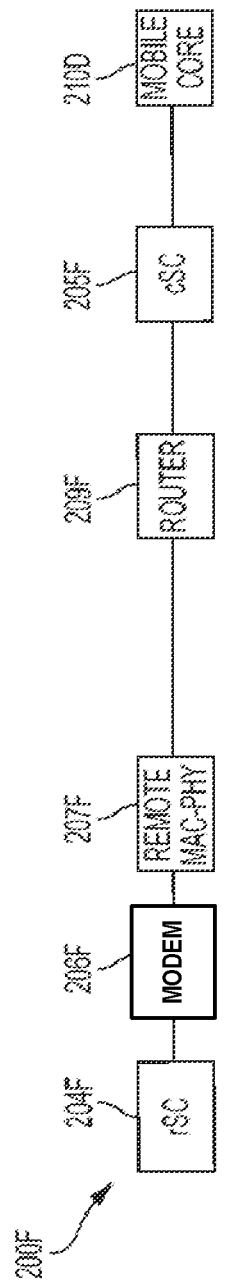

FIG. 2F illustrates a simplified block diagram of yet another embodiment of a SC-BH system communications environment 200F in which a communication network, such as but not limited to a DOCSIS network, is used to provide a backhaul for an LTE eNB. Similar to the communications environment 200A, the communications environment 200F supports connection of at least one UE via an RF interface to an rSC 204F portion of a split SC, which also includes a cSC portion 205F. One or more rSC 204F is connected to a modem 206F. In the embodiment shown in FIG. 2F, MTS functionality is split between a remote MAC/PHY 207F and a router 209F. The remote MAC/PHY 207F/router 209F/cSC 205F connects the rSC 204F/modem 206C to a mobile core 210F, which may be implemented as an LTE packet core. It will be understood that modem 206F may be collocated with rSC 204F or may be disposed in a location separate and independent from the rSC. Additionally, a collocated combination of the rSC 204F/modem 206F may be referred to herein as a SC-BH network element.

It will be noted that FIGS. 2A-2C illustrate embodiments comprising a standalone SC, while FIGS. 2D-2F illustrate embodiments comprising a split SC. It will be recognized that techniques described herein are equally applicable to any of the embodiments shown in FIGS. 2A-2F. It will be further recognized that the embodiments illustrated in FIGS. 2A-2F are provided for purposes of example only and are not meant to be an exhaustive list of embodiments in which the techniques described herein may be advantageously implemented. Moreover, although not illustrated in FIGS. 2A-2F, a network interface device ("NID") may optionally be provided between the SC/rSC and modem.

FIG. 3 shows one exemplary timing diagram for a SC-BH communication system 300.

Communication system 300 includes a UE 102 in wireless communication with an rSC 110. rSC 110 communicates in a wired or wireless manner with cSC 130 via a backhaul network, which includes a modem 122, a RPD 123, and a vMTS 124.

UE 102 is the same or similar to UE 102 of FIG. 1 and UEs described but not shown in FIGS. 2A-F. rSC 110 is the same or similar to rSCs 204D-F of FIGS. 2D-F. Modem 122 is the same or similar to modem 122 of FIG. 1 and modem 206A-F of FIGS. 2A-F. RPD 123 is the same or similar to RPD 209B, 209E and remote MAC-PHY 207C, 207F, depending on the implementation and embodiment. vMTS 124 is the same or similar to MTS 125 of FIG. 1, MTS 208A of FIG. 2A, MTS core 208B, 208E of FIGS. 2B and 2E respectively, router 209C, 209F or FIGS. 2C and 2F respectively, and I-MTS 208D of FIG. 2D, depending on the implementation and embodiment. cSC 130 is the same or similar to aspects of mobile core 210A-C of FIGS. 2A-C respectively, and cSC 205D-F or FIGS. 2D-F respectively.

As discussed above, LTE UL HARQ may be either adaptive or non-adaptive. In an adaptive embodiment PHY attributes may be changed between each transmission and retransmissions and between each retransmission. PHY attributes that may change include but are not limited to MCS order and redundancy version. In a non-adaptive embodiment the system may maintain PHY attributes between transmission and retransmission, and between retransmissions.

Figure 5:
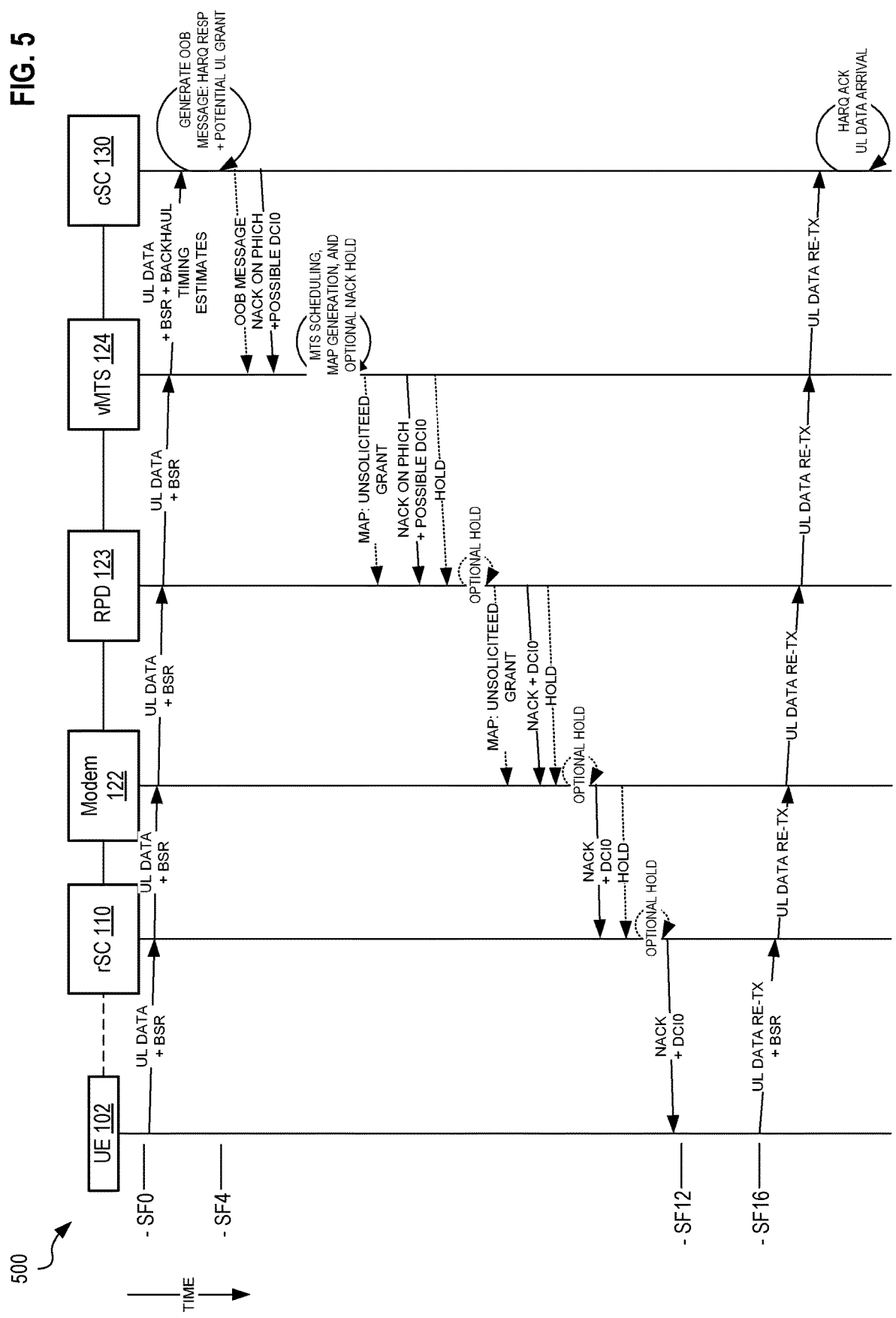
FIG. 5 shows one exemplary simplified block diagram and timing diagram for a Small Cell-BackHaul (SC-BH) communication system, in an embodiment.

In communication system 300, UE 102 transmits UL data plus a buffer status report (BSR) to cSC 130 via rSC 110, modem 122, RPD 123, and vMTS 124. vMTS may optionally add a backhaul timing estimate to the UL data plus BSR for processing at the cSC 130 (or an associated mobile core, not shown). If cSC 130 cannot read all or a portion of the UE 102's UL data then cSC 130 will transmit a NACK back UE 102. In an LTE embodiment, when the cSC 130's MAC layer determines a NACK is required, cSC 130 sends the NACK on the PHICH control channel with the optional DCI0. In FIGS. 3-5, "NACK on PHICH + optional DCI0" and "NACK + DCI0" are used interchangeably.

As discussed above, cSC 130 may optionally include a DCI0 for a quick scheduling assignment, shown as both "optional DCI0" and just "DCI0" in the figures. The remainder of this discussion will center on the transmission of the NACK without the DCI0. Once a NACK is received at UE 102, the UE re-transmits the UL data plus BSR as UL data retransmission (re-tx) plus BSR after 4 subframes of receiving the NACK. For example, the NACK is received at sub-frame (SF) 12 and the retransmission of UL data retransmission (re-tx) plus BSR occurs at SF16 from UE 102 to rSC 110. UL data re-tx plus BSR is then received at rSC 110 and forward to modem 122. Modem 122 then sends a REQ to RPD 123, which replies with a MAP which provides resources to modem 122 to transmit the UL data retransmission (re-tx) plus BSR. Modem 122 then transmits UL data re-tx plus BSR to vMTS 124. Upon receipt of the UL data re-tx plus BSR, RPD 123 then sends a REQ to vMTS 124, which replies with a MAP, which provides resources to RPD 123 to transmit the UL data re-tx plus BSR to vMTS 124. vMTS 124 then sends the UL data re-tx plus BSR to cSC 130 for processing.

FIG. 4 shows one exemplary timing diagram for a SC-BH communication system 400.

In the embodiment of FIG. 4, cSC 130 sends an Out Of Band (OOB) message informing vMTS 124 that a NACK is sent from cSC 130 to UE 102. As discussed further below, vMTS 124 may use this information to generate one or more unsolicited grants on the backhaul side (i.e., for one or more of RPD 123, modem 122, or other real elements or virtualized functions not show) for pipelining purposes.

Communication system 400 includes the same or similar UE 102, rSC 110, cSC 130, modem 122, RPD 123, and vMTS 124 as described and disclosed in FIG. 3, above.

For sake of simplicity, the optional backhaul timing estimate is not shown in system 400. Communication system 400 differs from system 300 in that cSC 130 generates the above referenced Out Of Band (OOB) message. This OOB message is sent to vMTS 124 to instruct vMTS 124 that a NACK is being or has been transmitted from cSC 130 to UE 102. cSC 130 may also send an optionally new grant summary, which includes all new transmission plus retransmissions. vMTS 124 may use this information to generate one or more unsolicited backhaul grants (shown in FIG. 4 as "MAP generation") for pipelining UE 102 data. Pipelining here means preparing and transmitting grants such that they are in place at one or more backhaul elements, (e.g., modem 122, RPD 123, and vMTS 124) prior to the arrival of UL data from UE 102 at the one or more backhaul element such that the UL data may be transmitted through the backhaul system with minimal or no delay. In a DOCSIS communication system these backhaul grants are provided by a MAP sent from a version of a Cable Modem Termination System or CMTS, as known in the art.

A solicited grant is a grant that is requested by a transmitting device, such as UE102. One example of a solicited grant can be seen in FIG. 3 after SF 16. Modem 122 transmits a REQ and in response receives a MAP for the purpose of transmitting UL data re-tx plus BSR. RPD 123 also transmits a REQ and in response receives a MAP for the purpose of transmitting UL data re-tx plus BSR. These are both types of solicited grants as known in the art.

An unsolicited grant is a grant that is not requested by a transmitting device, such as UE102. By preparing and having in place an unsolicited grant the multiple REQ-MAP-Transmit process described above for the solicited grant can be eliminated. Eliminating the solicited grant can save valuable time and reduce latency.

Since UE 102 has 8 UL HARQ processes, and they are synchronized, UE will look for N/ACK again in 8 subframes. For example, if a first transmission is sent at SF0 and no ACK was received by SF4, then UE 102 will wait for 8 subframes, i.e., UE 102 will wait until SF12 before doing anything else. eNB is responsible for sending correct HARQ response with correct timing, in time for UE to receive it at the next interval.

It will be understood that the transmit, receipt, and processing of the OOB message at cSC 130 and vMTS 124 is only one possible process for vMTS 124 to receive information for the generation of an unsolicited grant. In an alternative embodiment (not shown), cSC 130 does not transmit an OOB message. Instead, vMTS 124 directly or indirectly reads the NACK on PHICH plus possible DCI0 message sent from cSC 130. Directly or indirectly reading may be reading all or only a portion(s) of the message. Indirectly reading this message may be, for example, generating a copy of the message reading all or a portion(s) of the message. Reading the message, directly or indirectly, may cause vMTS 124 to generate the MAP, in the same or a similar manner as described above.

FIG. 5 shows one exemplary timing diagram for a SC-BH communication system 500. System 500 is similar to system 400 of FIG. 4 with the addition of optional holds included, which ensure the cSC 130 transmitted is received at US 102 at SF12, discussed further below.

For sake of simplicity "HARQ response plus potential UL grant" and "generate OOB message" of FIG. 4 are combine into a single "Generate OOB message: HARQ response plus potential UL grant." Furthermore, "UL data plus BSR" of FIG. 4 is changed to "UL data plus BSR plus backhaul timing estimates" in FIG. 5 to represent the option of adding backhaul timing estimates at vMTS 124 prior to transmission to cSC 130. Backhaul timing estimates will be discussed further below.

In the embodiment of FIG. 5, cSC 130 sends an Out Of Band (OOB) message informing vMTS 124 that a NACK is sent from cSC 130 to UE 102. As discussed further below, vMTS 124 may use this information to generate one or more unsolicited grants on the backhaul side (i.e., for one or more of RPD 123, modem 122, or other real elements or virtualized functions not show) for pipelining purposes. As discussed above, vMTS 124 may employ alternative process and/or devices to obtain data to generate an unsolicited grant, e.g., directly or indirectly reading the NACK on PHICH plus possible DCI0 message.

Starting where system 500 diverges from system 400, vMTS 124 adds an optional backhaul timing estimate data to the UL data plus BSR for transmission to cSC 130. vMTS 124 then transmits UL data plus BSR plus backhaul timing estimate to cSC 130. Utilizing one or both of the optional backhaul timing estimate data and the UL data plus BSR for transmission cSC 130 generates the OOB message and HARQ response plus potential UL grant. The OBB message and the NACK are sent, either together or separately, to vMTS 124. vMTS 124 reads the OBB message and generates an MAP detailing one or more unsolicited grants and prepares a vMTS 124 schedule for the backhaul system. In addition, and important to the embodiment of system 500, vMTS 500 determines if a hold is required to ensure that NACK arrives at UE 102 at SF12. If vMTS 124 determines that a hold will benefit the communication process, then vMTS 124 determines the length of the hold and where the hold will occur. In various embodiments, the length of the hold may be determined forward from the original transmission at SF0 or backwards from when the NACK needs to arrive at, e.g., at SF12. The hold may occur at any one of the backhaul elements that are shown, such as modem 102, RPD 123, and MTS 124, or those that are not shown, non-limiting examples of which can be seen in FIGS. 2A-F. In another embodiment a NACK hold may occur at rSC 110 or some other small cell element or virtualized function.

In all other ways system 500 is similar or the same as system 400.

In a separate embodiment, the NACK hold is a small cell NACK hold, which is controlled on the small cell side, for example by one or more of the rSC 102, cSC 130, and the mobile core (not shown). In one example, cSC 130 receives and analyzes (or forwards to another cooperating element for analysis) the backhaul timing estimates provided by vMTS 124 to determine the backhaul transmit times for the purpose of ensuring a cSC 130 transmitted NACK arrives at UE 102 at SF12. This analysis may also take into consideration the transmit time between cSC 130 and vMTS 124.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for pipelining data retransmission, comprising:
   receiving, at a wireless access point, uplink data from a user equipment (UE);
   determining, at the wireless access point, that the uplink data must be retransmitted from the UE to the wireless access point; and
   in response to determining that the uplink data must be retransmitted from the UE to the wireless access point:
      sending at least one of buffer status information and Grant information from the wireless access point to a first communication device upstream of the wireless access point, to prepare communication infrastructure upstream of the wireless access point for retransmission of the uplink data from the UE to the wireless access point, and
      instructing the UE to retransmit the uplink data to the wireless access point.

2. The method of claim 1, further comprising aggregating a plurality of buffer status reports received from the UE to generate the buffer status information.

3. The method of claim 1, further comprising aggregating a plurality of wireless data transmission Grants to generate the grant information.

4. The method of claim 1, further comprising:
   receiving, at the first communication device, at least one of the buffer status information and the Grant information; and
   in response to receiving at least one of the buffer status information and the Grant information at the first communication device, sending, to a second communication device upstream of the first communication device, a request for data transmission resources to handle retransmission of the uplink data from the UE to the wireless access point.

5. The method of claim 4, wherein:
   the first communication device comprises a modem; and
   the second communication device comprises a modem termination system.

6. A method for pipelining data retransmission, comprising:
   receiving, at a modem termination system, uplink data from a user equipment (UE);
   sending the uplink data from the modem termination system to a wireless access point element upstream of the modem termination system;
   receiving, at the modem termination system, a first message from the wireless access point element upstream of the modem termination system, the first message instructing the UE to retransmit the uplink data;
   sending the first message from the modem termination system to the UE;
   generating an unsolicited Grant at the modem termination system; and
   sending the unsolicited Grant to one or more communication devices downstream of the modem termination system.

7. The method of claim 6, further comprising receiving, at the modem termination system, a second message from the wireless access point element upstream of the modem termination system indicating that the UE is being instructed to retransmit the uplink data.

8. The method of claim 7, further generating the unsolicited Grant at the modem termination system in response to receiving the second message at the modem termination system.

9. The method of claim 6, further comprising reading, at the modem termination system, at least a portion of the first message to trigger generation of the unsolicited Grant.

10. The method of claim 9, wherein reading the at least the portion of the first message comprises directly reading the at least the portion of the first message.

11. The method of claim 9, wherein reading the at least the portion of the first message comprises indirectly reading the at least the portion of the first message.

12. The method of claim 6, further comprising determining, at the modem termination system, that a hold is necessary for the UE to receive the first message at a predetermined time.

13. The method of claim 12, further comprising determining, at the modem termination system, a length of the hold that is required for the UE to receive the first message at the predetermined time.

14. The method of claim 12, further comprising determining, at the modem termination system, a location of the hold in the one or more communication devices downstream of the modem termination system.

15. The method of claim 14, further comprising sending, from the modem termination system, instructions to perform the hold to the location of the hold in the one or more communication devices downstream of the modem termination system.

16. The method of claim 6, wherein the wireless access point element comprises a centralized small cell.

17. A method for pipelining data retransmission, comprising:
   receiving, at a wireless access point element, uplink data from a user equipment (UE);
   determining, at the wireless access point element, that at least a portion of the uplink data cannot be read;
   in response to determining that at least the portion of the uplink data cannot be read, sending a first message from the wireless access point element to the UE instructing the UE to retransmit the uplink data; and
   sending a second message from the wireless access point to a modem termination system downstream of the wireless access point element indicating that the UE is being instructed to retransmit the uplink data.

18. The method of claim 17, wherein receiving, at the wireless access point element, the uplink data from the UE comprises receiving the uplink data from the UE via the modem termination system.

19. The method of claim 17, wherein the first message includes downlink control information.

20. The method of claim 17, wherein the wireless access point element comprises a centralized small cell.

* * * * *